(12) United States Patent
Zhou et al.

(10) Patent No.: US 10,086,744 B2
(45) Date of Patent: Oct. 2, 2018

(54) AUTOMATIC TIGHTENING DEVICE WITH ROLLING AND UNROLLING CONTROL FUNCTIONS

(71) Applicant: Jiangsu Runyang Logistic Control Co., Ltd., Tiazhou (CN)

(72) Inventors: Jing Zhou, Taizhou (CN); Xianwei Yang, Taizhou (CN); Chunzhi Li, Taizhou (CN)

(73) Assignee: JIANGSU RUNYANG LOGISTIC CONTROL CO., LTD., Taizhou (CN)

( * ) Notice: Subject to any disclaimer, the term of this patent is extended or adjusted under 35 U.S.C. 154(b) by 0 days.

(21) Appl. No.: 15/338,531

(22) Filed: Oct. 31, 2016

(65) Prior Publication Data

US 2017/0120797 A1 May 4, 2017

(30) Foreign Application Priority Data

Oct. 31, 2015 (CN) .......................... 2015 1 0722499

(51) Int. Cl.
*B60P 7/08* (2006.01)
(52) U.S. Cl.
CPC .................................... *B60P 7/083* (2013.01)
(58) Field of Classification Search
CPC ....................................................... B60P 7/083
See application file for complete search history.

(56) References Cited

U.S. PATENT DOCUMENTS 6,139,234 A * 10/2000 Huang .................... B60P 7/083
410/100

6,641,116 B1 * 11/2003 Huang .................... B60P 7/083
24/68 CD (Continued)

FOREIGN PATENT DOCUMENTS

CN          1843653 A       10/2006
CN        101734384 A        6/2010
(Continued)

OTHER PUBLICATIONS

First Office Action dated Dec. 26, 2016 by the State Intellectual Office of the People's Republic of China for Patent Application No. 201510722499.1, which was filed on Oct. 31, 2015 and published as CN 105235933 on Jan. 13, 2016 (Inventor—Zhou et al.; Applicant—Jiangsu Runyang Logistic Control Co., Ltd.) (Original—6 pages // Translation—7 pages).

(Continued)

*Primary Examiner* — Michael E Gallion
(74) *Attorney, Agent, or Firm* — Ballard Spahr LLP

(57) ABSTRACT

Provided is an automatic tightening device with rolling and unrolling control functions. A handle, a base, and a spool are pivotally connected together by a reel having an associated relationship with the spool and provided with a coil spring driving structure at an end. The handle and the base each has two parallel sidewalls. A movable pawl/stop pawl is mounted between the sidewalls of the handle/base. The two pawls can be in contact with any tooth around ratchet wheel sheets. A no-load webbing unrolling-rolling-stopping region, a safe lock position, a tightening operation region, and a load releasing region are provided at an edge of the base. The no-load webbing unrolling-rolling-stopping regions at the edges of the base are inclined surfaces, end surfaces of the stop and movable pawls are chamfers, and a no-load releasing cam rim and a load releasing cam rim are provided at an edge of the handle.

5 Claims, 9 Drawing Sheets

(56) References Cited

U.S. PATENT DOCUMENTS

| | | | | |
|---|---|---|---|---|
| 6,708,953 B1* | 3/2004 | Chang | | B60P 7/083 254/218 |
| 6,880,810 B1* | 4/2005 | Hu | | B60P 7/083 24/69 ST |
| 7,020,933 B2* | 4/2006 | Chang | | A44B 11/125 24/68 CD |
| 7,207,089 B2* | 4/2007 | Hanson | | B60P 7/083 24/68 CD |
| 7,281,701 B1* | 10/2007 | Huang | | B60P 7/083 24/69 CT |
| 7,444,718 B1* | 11/2008 | Chang | | B60P 7/083 24/68 CD |
| 7,503,736 B1* | 3/2009 | Chen | | B60P 7/083 410/100 |
| 7,651,072 B1* | 1/2010 | Chang | | B25B 25/00 24/68 CD |
| 7,836,560 B2* | 11/2010 | Huang | | B60P 7/083 24/68 B |
| 7,877,846 B1* | 2/2011 | Chen | | B60P 7/0846 24/68 CD |
| 8,157,245 B2* | 4/2012 | Huang | | B60P 7/083 24/69 CT |
| 8,721,240 B1* | 5/2014 | Wu | | B60P 7/083 410/121 |
| 9,725,029 B2* | 8/2017 | Chou | | B60P 7/083 |
| 9,771,014 B2* | 9/2017 | Brown | | B60P 7/083 |
| 2009/0013511 A1* | 1/2009 | Chang | | B60P 7/083 24/68 CD |
| 2009/0047091 A1* | 2/2009 | Huck | | B60P 7/083 410/100 |
| 2009/0119892 A1* | 5/2009 | Breeden | | B60P 7/083 24/68 CD |
| 2009/0133235 A1* | 5/2009 | Chang | | B60P 7/083 24/68 CD |
| 2009/0283729 A1* | 11/2009 | Carlson | | B25B 25/00 254/218 |
| 2010/0205790 A1* | 8/2010 | Chen | | B60P 7/083 24/68 CD |
| 2015/0224912 A1* | 8/2015 | Brown | | B60P 7/083 242/395 |

FOREIGN PATENT DOCUMENTS

| | | |
|---|---|---|
| CN | 101844340 A | 9/2010 |
| CN | 201646536 U | 11/2010 |
| CN | 102923335 A | 2/2013 |
| DE | 1223746 B | 8/1966 |

OTHER PUBLICATIONS

Second Office Action dated Jun. 14, 2017 by the State Intellectual Office of the People's Republic of China for Patent Application No. 201510722499.1, which was filed on Oct. 31, 2015 and published as CN 105235933 on Jan. 13, 2016 (Inventor—Zhou et al.; Applicant—Jiangsu Runyang Logistic Control Co., Ltd.) (Original—5 pages // Translation—8 pages).

* cited by examiner

AUTOMATIC TIGHTENING DEVICE WITH ROLLING AND UNROLLING CONTROL FUNCTIONS

CROSS-REFERENCE TO RELATED APPLICATIONS

This U.S. Application claims priority to Chinese Patent Application No. 201510722499.1, filed Oct. 31, 2015, which is hereby incorporated by reference in its entirety.

TECHNICAL FIELD

The present invention relates to the technical field of mechanical devices, and specifically to an automatic tightening device with rolling and unrolling control functions.

BACKGROUND ART

Automatic tightening devices, also known as tighteners for strapping cargoes are common in places where commodities are circulated and can strap stacks of cargoes transported by a vehicle together to avoid loosening during transportation and prevent damage of the commodities or occurrence of safety accident.

Currently, there are two kinds of automatic tightening devices in the market, one having rolling and unrolling control functions and the other having no rolling and unrolling control functions. A driving structure for automatic rolling is realized by the process of releasing a coil spring, and during the automatic rolling, long webbing is rolled up quickly and unimpededly, but a hook at an end of the long webbing is pulled back by inertia which causes jump phenomenon and relatively increases the rate of accidental injuries of operators or nearby people.

Therefore, the automatic tightening device with rolling and unrolling control functions is a main trend in the market. However, among the tightening device with rolling and unrolling control functions in the current market, some achieve their functions by being added with an unrolling stopping structure part, may easily misguide users under a load state, and have high cost, while some are not additionally added with an unrolling stopping structure part, but operations thereof are very complicated, which will certainly affect the operation efficiency and actual practicability.

How to reduce the rate of accidental injuries caused by automatic rolling while providing an automatic tightening device with rolling and unrolling control functions, which is operated conveniently and has a simplified structure and low cost, becomes the problem to be solved by the present invention.

DISCLOSURE OF THE INVENTION

In view of the current situation in the prior art, the present invention is intended to solve the technical problem of providing an automatic tightening device with rolling and unrolling control functions which is operated conveniently and has a simplified structure and low cost to improve the safety and efficiency of operations.

The technical solution adopted by the present invention is directed to: an automatic tightening device with rolling and unrolling control functions, with a base and a handle being pivotally connected together by a mandrel, wherein the base has two parallel sidewalls. A short webbing fixing shaft, a long webbing guide shaft, and a stop pawl in flexible contact with a spool are provided between the two sidewalls of the base; the mandrel is connected to the spool and a coil spring, the spool has left and right ratchet wheels riveted together by a roller, and long webbing is rolled up by the spool. A no-load webbing unrolling-rolling-stopping region, a safe lock position, a tightening operation region, and a load releasing region are provided at an edge of the base; and the handle has two parallel sidewalls, and a movable pawl in flexible contact with the spool is provided between the two sidewalls of the handle. The movable pawl is sheathed with a plastic sheath facilitating an operation by an operator. A load releasing cam rim and a no-load releasing cam rim are provided at an edge of the handle, respectively. A pivotally-connected part is connected to the spool which has an associated relationship with ratchet wheel sheets so as to enable rolling or unrolling of an webbing, wherein when the handle is closed and there is no load on the base, the edges of the sidewalls of the handle and edges of sidewalls of a housing form two cam rims which simultaneously push open the stop pawl and the movable pawl, respectively; and in a load state where the handle is opened to form an angle with the base, the edges of the sidewalls of the handle and the edges of the sidewalls of the housing form another two cam rims which push open the stop pawl and the movable pawl, respectively; the base is provided, at the edges of the sidewalls thereof, with a sliding groove which limits the range of movement of the stop pawl that drives the ratchet wheel sheets and a locking groove in which the stop pawl is not allowed to swing; both of sections of the stop pawl and the movable pawl have rounded chamfers, so that the stop pawl and the movable pawl abut against any of teeth at peripheries of the ratchet wheels. The whole tightening device has the base and the handle pivotally connected together by the mandrel; when the movable pawl in the handle is located at the no-load webbing unrolling-rolling-stopping regions at the edges of the base, since the webbing unrolling-rolling-stopping regions at the edges of the base are inclined surfaces, end surfaces of the movable pawl cooperate with the inclined surfaces at the edges of the webbing unrolling-rolling-stopping regions of the base to form one component force, and at the same time, end surfaces of the stop pawl cooperate with inclined surfaces of the load releasing cam rims in the handle to form another component force, under the action of the two component forces, the whole handle is pushed to the highest point by the component forces, and in this case, the end surfaces of the movable pawl are located at the lowest point of the inclined surfaces at the edges of the webbing unrolling-rolling-stopping regions of the base, i.e., the movable pawl is closest to a center of pivoting; and similarly, it is the same for the stop pawl, and in this case, the movable pawl and the end surfaces of the stop pawl are in contact with edges of the spool so as to create the effect of stopping automatic webbing rolling of the spool; and when the handle is pressed down, or the movable pawl is pulled open and the handle is pressed down, the movable pawl and the stop pawl slide to the highest point by being guided by the inclined surfaces at the edges of the webbing unrolling-rolling-stopping region of the base and by the inclined surfaces of the load releasing cam rim in the handle, respectively, i.e., the movable pawl and the stop pawl are farthest away from the center of pivoting, and thus the spool automatically rolls up the webbing by driving of the coil spring.

When the movable pawl in the handle is located at the safe lock positions at the edges of the base, the movable pawl is locked in grooves of the safe lock positions, and at this time, the stop pawl is located at the bottommost portions of the ratchet wheels so as to achieve safe strapping in a load state.

When the movable pawl in the handle is located at the tightening operation regions at the edges of the base, swinging of the handle can drive the spool to roll up the long webbing so as to strap cargoes tightly, like a conventional tightening device.

When the movable pawl in the handle is located at the load releasing regions at the edges of the base, the stop pawl is pushed away by the load releasing cam rim of the handle, that is, the strapping force can be released safely.

A rolling and unrolling mechanism which has an associated relationship with the spool is mounted outside the base.

The present invention has the advantages that: since in the automatic tightening device with rolling and unrolling control functions, an edge of a base is provided with a no-load webbing unrolling-rolling-stopping region, a safe lock position, a tightening operation region, and a load releasing region, when the movable pawl in the handle cooperates with the no-load webbing unrolling-rolling-stopping regions of the base, and when the handle is pressed against the base, or the movable pawl is pulled and the handle is pressed, long webbing can be rolled up by the spool under the action of the coil spring force; and when the force, with which the handle is pressed against the base, is released, or the force, with which the movable pawl is pulled and the handle is pressed, is released, the stop pawl and the movable pawl are brought into contact with the circumference of the spool, and the automatic rolling of the long webbing is stopped. When the movable pawl in the handle is located at the safe lock positions at the edges of the base, the whole handle cannot be swung around the base, and the safe strapping function is achieved in a load state. This greatly improves the efficiency of strapping and the convenience and safety of operation.

DETAILED DESCRIPTION OF EMBODIMENTS

Figure 1:
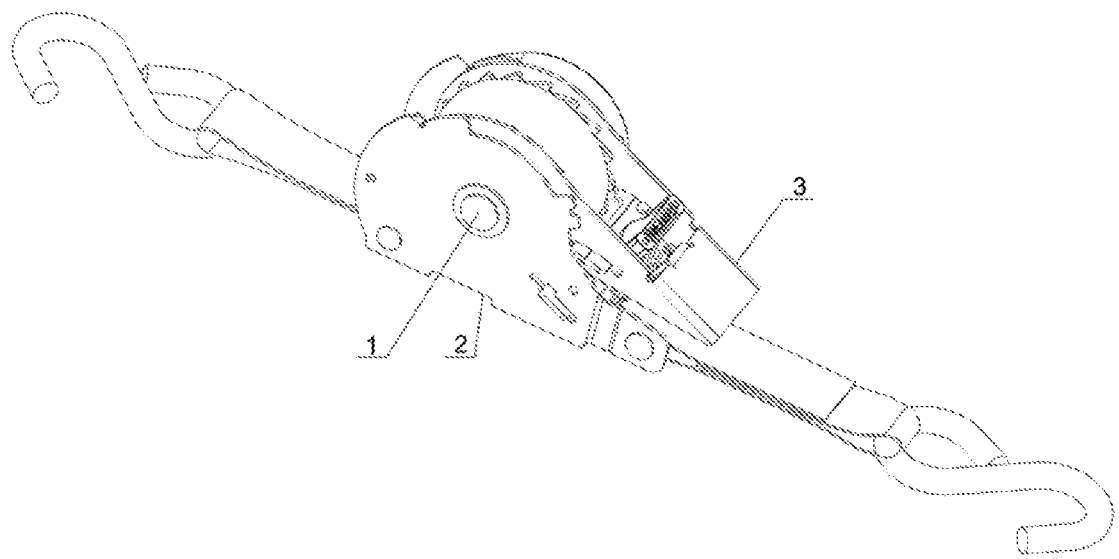
FIG. 1 is a perspective schematic diagram of the present invention.
Figure 2:
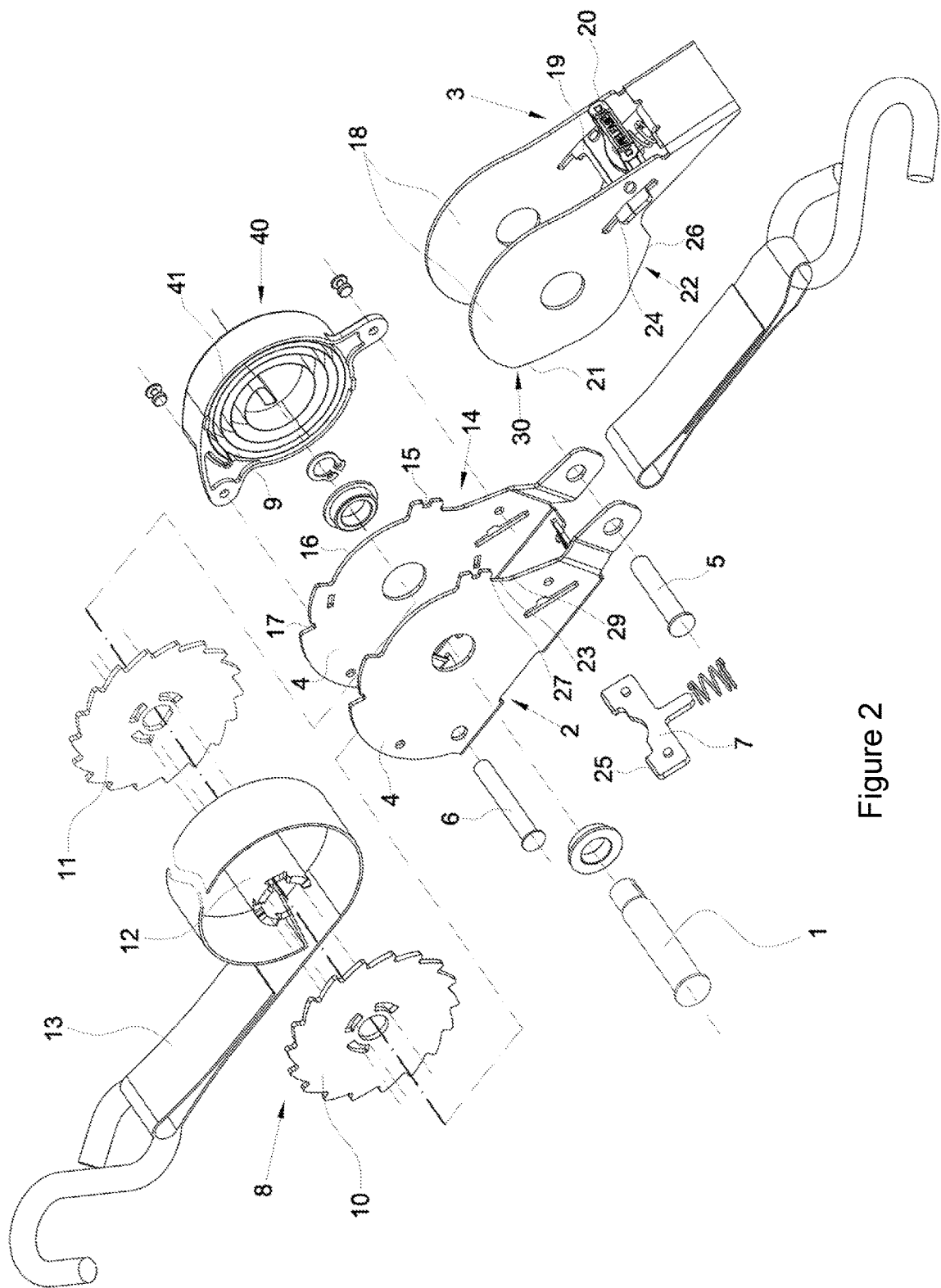
FIG. 2 is an exploded view of the present invention.
Figure 3:
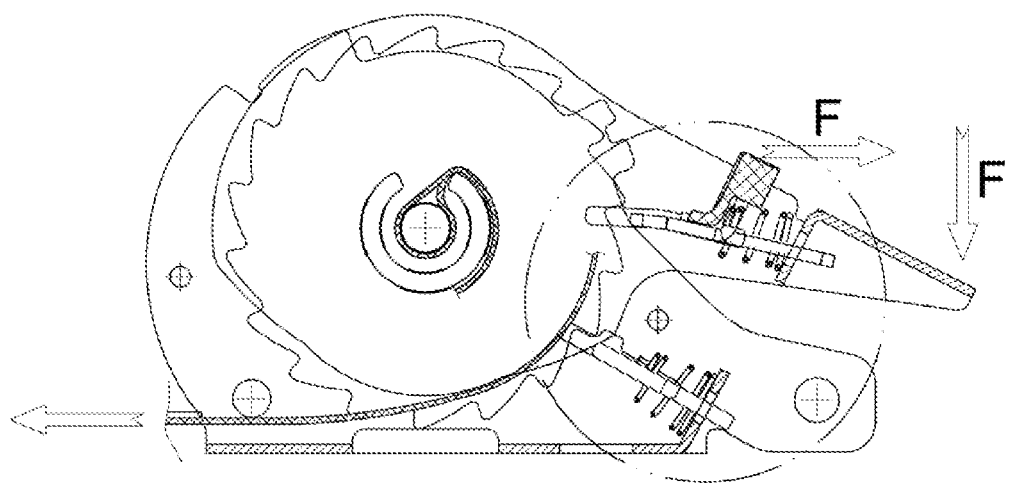
FIG. 3 is a schematic diagram of releasing webbing in the present invention.
Figure 4:
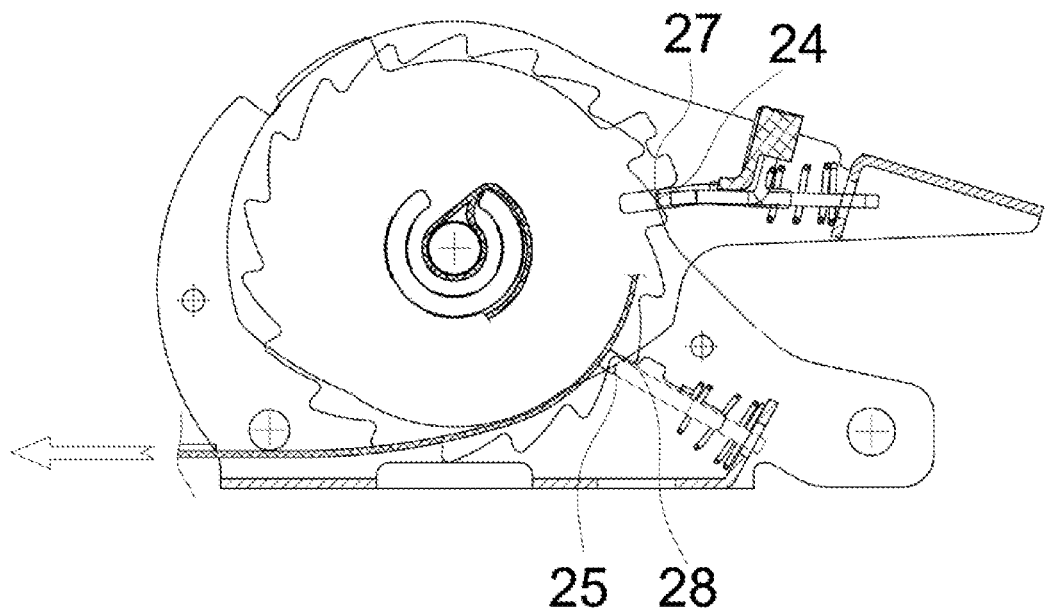
FIG. 4 is a schematic diagram of stopping the webbing in the present invention.
Figure 5:
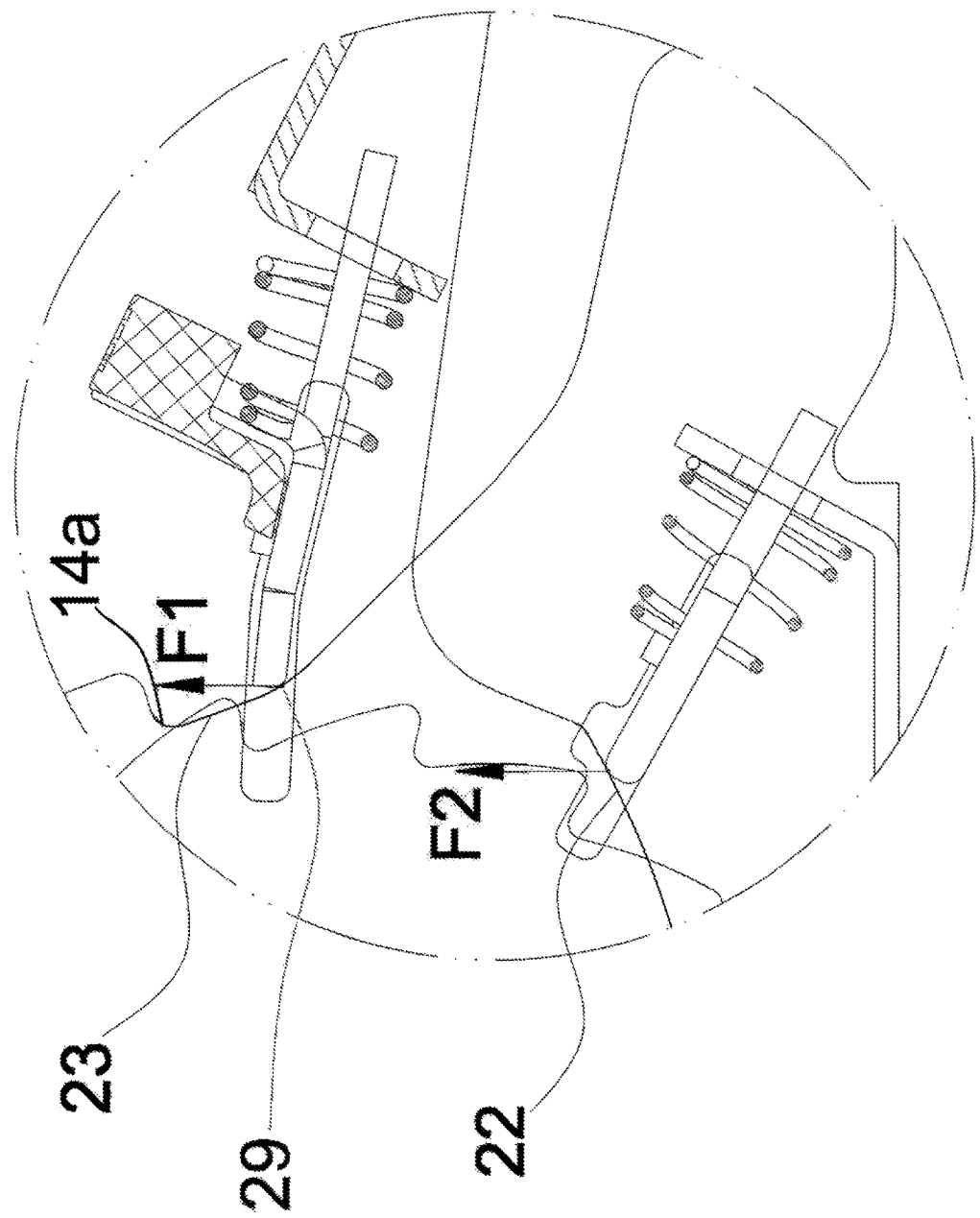
FIG. 5 is a partial enlarged view of a webbing unrolling structure in the present invention.
Figure 6:
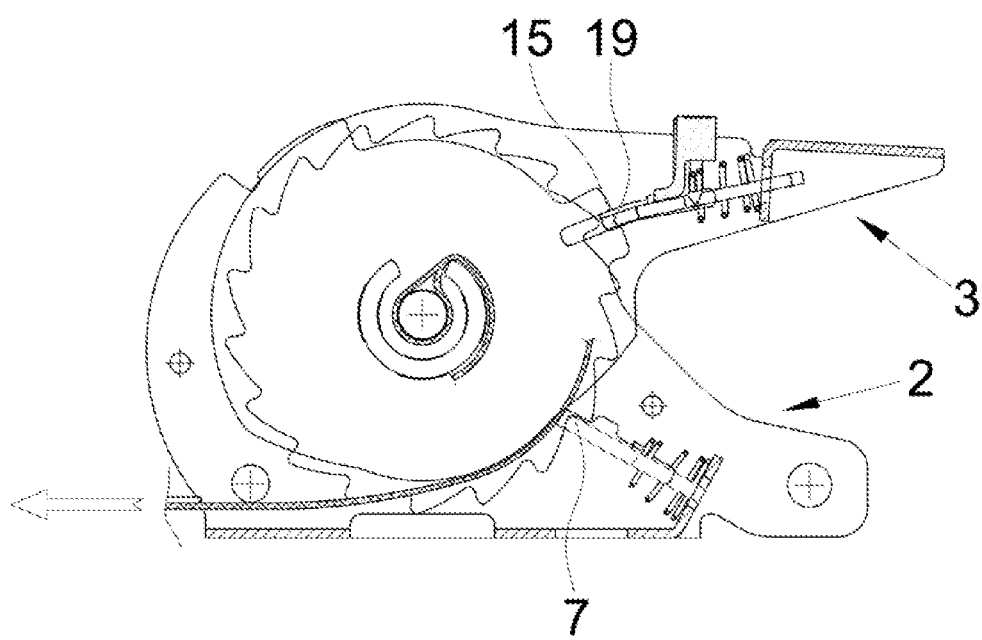
FIG. 6 is a schematic diagram, in which a state of a safe lock position in the present invention is shown.
Figure 7:
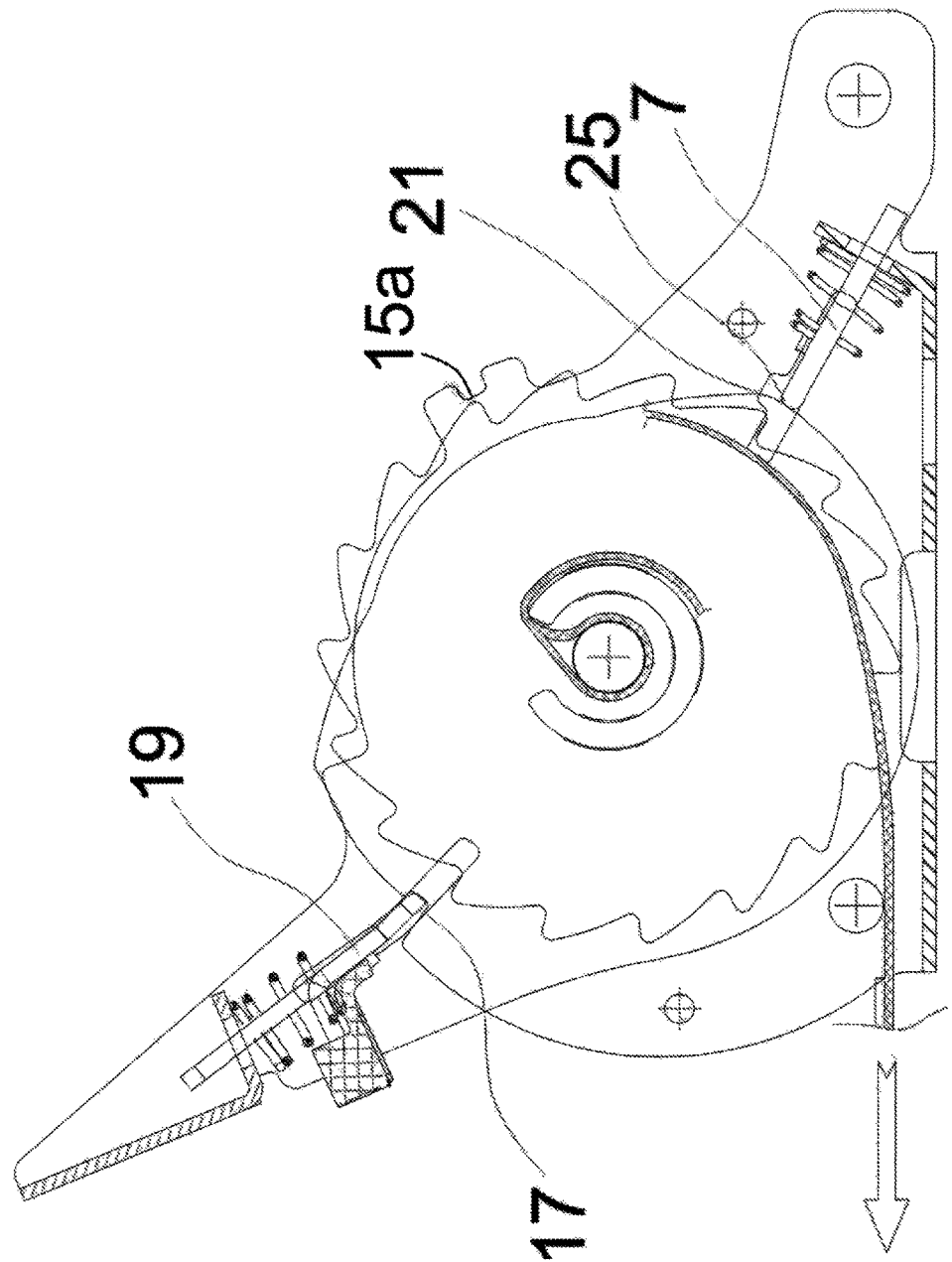
FIG. 7 is a schematic diagram of load releasing in the present invention.
Figure 8:
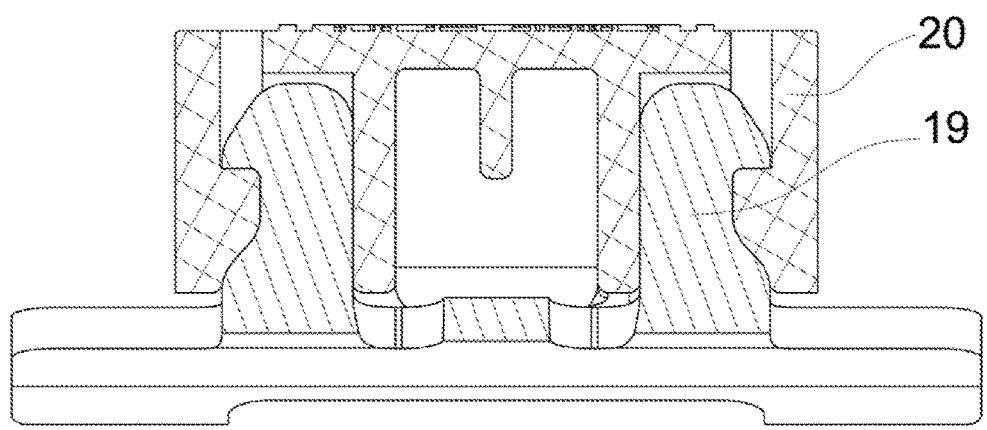
FIG. 8 is a structural diagram of a movable pawl in a plastic sheath in the present invention.
Figure 9:
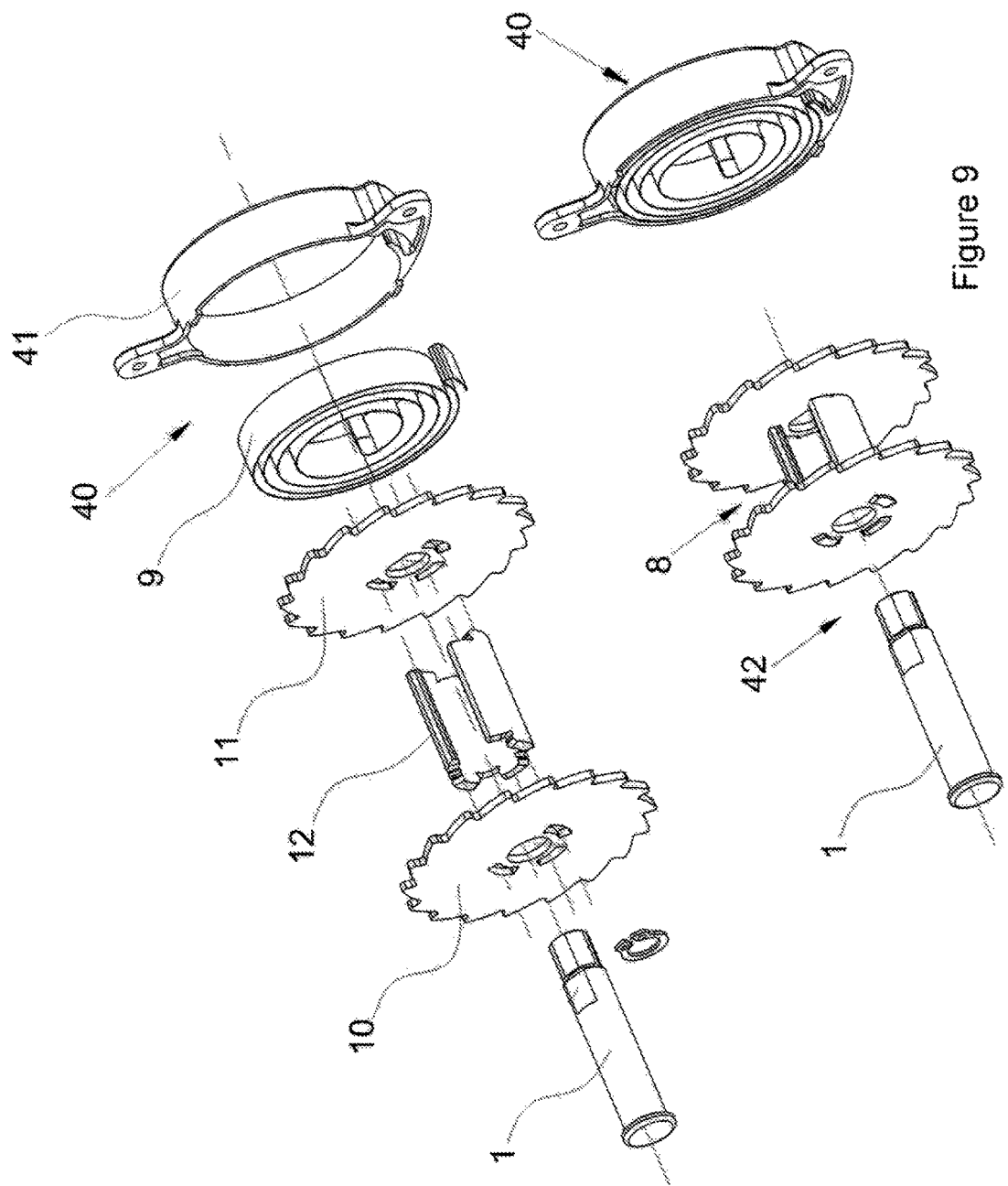
FIG. 9 is a perspective, schematic diagram depicting the assembly of an exemplary rolling and unrolling mechanism as disclosed herein.

As shown in FIGS. 1-8, an automatic tightening device with rolling and unrolling control functions of the present invention has a base 2 and a handle 3 pivotally connected together by a mandrel 1, wherein the base 2 has two parallel sidewalls 4. A short webbing fixing shaft 5, a long webbing guide shaft 6, and a stop pawl 7 in flexible contact with a spool are provided between the two sidewalls 4 of the base. The mandrel 1 is connected to the spool 8 and a coil spring 9. As shown in FIGS. 2 and 9, the coil spring 9 can be housed inside of a coil spring box 41, together forming a rolling and unrolling mechanism 40. The spool 8 has a left ratchet wheel 10 and a right ratchet wheel 11 riveted together by a roller 12, and long webbing 13 is rolled up by the spool 8. A no-load webbing unrolling-rolling-stopping region 14, having a sliding groove 14a, a safe lock position 15 having a locking groove 15a, a tightening operation region 16, and a load releasing region 17 are provided at an edge of the base.

The handle 3 has two parallel sidewalls 18, and a movable pawl 19 in flexible contact with the spool is provided between the two sidewalls 18 of the handle. The movable pawl 19 is sheathed with a plastic sheath 20 facilitating an operation by an operator. A load releasing cam rim 21 and a no-load releasing cam rim 22 are provided at an edge of the handle, respectively.

When the movable pawl 19 in the handle is located at the no-load webbing unrolling-rolling-stopping regions 14 at the edges of the base, since the edges of the webbing unrolling-rolling-stopping regions 14 of the base are inclined surfaces 23, end surfaces 24 of the movable pawl cooperate with the inclined surfaces 23 at the edges of the webbing unrolling-rolling-stopping regions of the base to form a component force F1, and at the same time, end surfaces 25 of the stop pawl cooperate with inclined surfaces 26 of the no-load releasing cam rims in the handle to form a component force F2. Under the action of the two component forces F1 and F2, the whole handle is pushed to the highest point by the component forces, and in this case, the end surfaces 24 of the movable pawl are located at the lowest point 27 of the inclined surfaces 23 at the edges of the webbing unrolling-rolling-stopping regions of the base, i.e., the movable pawl is closest to a center of pivoting, and similarly, it is the same for the stop pawl. In this case, the movable pawl 19 and the end surfaces 25 of the stop pawl are in contact with edges 28 of the spool, so as to create the effect of stopping automatic webbing rolling of the spool. When the handle is pressed or the movable pawl is pulled open and the handle is pressed down under the action of a force F, the movable pawl 19 and the stop pawl 7 slide to the highest point 29 by being guided by the inclined surfaces 23 at the edges of the webbing unrolling-rolling-stopping region of the base and by the inclined surfaces 26 of the no load releasing cam rim in the handle, respectively, i.e., the movable pawl 19 and the stop pawl 7 are farthest away from the center of pivoting, and thus the spool 8 automatically rolls up the long webbing under driving of the coil spring 9.

When the movable pawl 19 in the handle is located at the safe lock positions 15 at the edges of the base, the movable pawl 19 is locked in grooves 15a of the safe lock positions 15, and at this time, the stop pawl 7 is located at the bottommost portions of the ratchet wheels, that is, the stop pawl can bear the load of operation.

When the movable pawl 19 in the handle is located at the tightening operation regions 16 at the edges of the base, swing of the handle can drive the spool 8 to roll up the long webbing 13 so as to strap cargoes tightly, like a conventional tightening device.

When the movable pawl 19 in the handle is located at the load releasing regions 17 at the edges of the base, the stop pawl 7 is pushed away by the load releasing cam rim 21 of the handle, that is, the strapping force can be released safely.

The above is a preferred embodiment of the present invention, but many variations and modifications also can be made in addition to the above-mentioned embodiment. For example, the movable pawl can be changed to be in a pressing manner. The base and the handle can be coated with plastics to have appearances with various different shapes or structures. Therefore, it would be understood by those skilled in the art that any modifications made without departing from the principle of the present invention should be considered to fall within the scope of protection of the present invention.

The invention claimed is:

1. An automatic tightening device with rolling and unrolling control functions, comprising: a base and a handle being pivotally connected together by a mandrel, wherein the mandrel is connected with a spool and a coil spring, the spool having an associated relationship with a left ratchet wheel and a right ratchet wheel and being riveted with the left ratchet wheel and the right ratchet wheel through a roller, the spool being configured for rolling a long webbing;

wherein the base has two parallel sidewalls, and a short webbing fixing shaft and a long webbing guide shaft provided between the two parallel sidewalls of the base;

wherein the handle has two parallel sidewalls;

wherein a no-load webbing unrolling-rolling-stopping region, a safe lock position, a tightening operation region, and a load releasing region are provided at an edge of each of the two sidewalls of the base; a stop pawl in flexible contact with the spool is mounted between the two sidewalls of the base and a movable pawl in flexible contact with the spool is provided between the two sidewalls of the handle, wherein the movable pawl is sheathed with a plastic sheath facilitating an operation by an operator, the stop pawl and the movable pawl having respective end surfaces configured to abut any teeth located at peripheries of the left and right ratchet wheels; wherein each no-load webbing unrolling-rolling-stopping region comprises a sliding groove which is formed at the edge of a respective sidewall of the base and configured to limit the range of movement of the stop pawl that drives the left and right ratchet wheels, and a locking groove in which the stop pawl is not allowed to swing; wherein the locking groove is located at the safe lock position formed at the edge of a respective sidewall of the base and configured to limit the range of movement of a movable pawl, wherein when the movable pawl is in the locking groove, the stop pawl is not able to swing; wherein a load releasing cam rim and a no-load releasing cam rim are provided at an edge of the handle, respectively; wherein when the handle is closed and there is no load on the base, the edges of the sidewalls of the handle and the edges of the sidewalls of the base form two cam rims which simultaneously push the stop pawl and the movable pawl to open, respectively; wherein in a load state where the handle is opened to form an angle with the base, the edges of the sidewalls of the handle and the edges of the sidewalls of the base form another two cam rims which push the stop pawl and the movable pawl to open, respectively; wherein the no-load webbing unrolling-rolling-stopping regions at the edges of the sidewalls of the base are inclined surfaces, and the end surfaces of the movable pawl cooperate with the inclined surfaces of the webbing unrolling-rolling-stopping regions of the base to form a first component force; wherein at the same time, the end surfaces of the stop pawl cooperate with inclined surfaces of the load releasing cam rims in the handle to form a second component force; wherein under action of the first and second component forces, the movable pawl and the stop pawl are pushed to bottommost portions of the no-load webbing unrolling-rolling-stopping regions, and the stop pawl and the movable pawl are in contact with edges of the left and right ratchet wheels, so as to create an effect of stopping automatic webbing rolling of the spool; and wherein when the handle is pressed down, the movable pawl and the stop pawl slide to topmost portions of the no-load webbing unrolling-rolling-stopping regions by being guided by the inclined surfaces of the webbing unrolling-rolling-stopping regions of the base and by the inclined surfaces of the load releasing cam rims in the handle, respectively, the movable pawl and the stop pawl are separated from the edges of the left and right ratchet wheels, and the spool automatically rolls up the webbing by driving of the coil spring.

2. The automatic tightening device with rolling and unrolling control functions according to claim 1, wherein the movable pawl is locked in the locking groove, and at this time, the stop pawl is located at the bottommost portions of the left and right ratchet wheels so as to serve safe strapping function.

3. The automatic tightening device with rolling and unrolling control functions according to claim 1, wherein a rolling and unrolling mechanism which has an associated relationship with the spool is mounted outside the base.

4. The automatic tightening device with rolling and unrolling control functions according to claim 1, wherein the spool covers outside the mandrel for rolling or unrolling the long webbing, wherein the spool and the mandrel form a rolling component and the spool has the left and right ratchet wheels riveted together by the roller, and wherein the mandrel is configured to drive the spool to roll together to form the rolling component.

5. The automatic tightening device with rolling and unrolling control functions according to claim 3, wherein the rolling and unrolling mechanism comprises a coil spring and a coil spring box.

* * * * *